(12) United States Patent
Esteve

(10) Patent No.: US 8,191,738 B2
(45) Date of Patent: Jun. 5, 2012

(54) DEVICE FOR GRAINS DOSING WITH AIR SEALING

(75) Inventor: Victor Esteve, São Paulo (BR)

(73) Assignee: Pharmaprov Importacao e Exportacao Ltda., Sao Paulo-SP (BR)

( * ) Notice: Subject to any disclaimer, the term of this patent is extended or adjusted under 35 U.S.C. 154(b) by 374 days.

(21) Appl. No.: 12/438,444

(22) PCT Filed: Jun. 15, 2007

(86) PCT No.: PCT/BR2007/000155
§ 371 (c)(1),
(2), (4) Date: Oct. 23, 2009

(87) PCT Pub. No.: WO2008/022418
PCT Pub. Date: Feb. 28, 2008

(65) Prior Publication Data
US 2010/0065586 A1 Mar. 18, 2010

(30) Foreign Application Priority Data

Aug. 24, 2006 (BR) ................................. PI 0603468
Jan. 12, 2007 (BR) ................................. C1 0603468

(51) Int. Cl.
*G01F 11/10* (2006.01)
(52) U.S. Cl. ..................................... 222/361; 222/181.1

(58) Field of Classification Search .......... 222/361–366, 222/181.1–181.3, 460, 461
See application file for complete search history.

(56) References Cited

U.S. PATENT DOCUMENTS

| 4,174,058 | A | * | 11/1979 | Bassignani ................... 222/438 |
| 5,421,491 | A | * | 6/1995 | Tuvim et al. .................. 222/336 |
| 5,685,461 | A | | 11/1997 | Mitchell |
| 5,855,300 | A | * | 1/1999 | Malki ....................... 222/153.09 |
| 6,315,170 | B1 | * | 11/2001 | Thomson et al. ............. 222/361 |
| 6,450,371 | B1 | | 9/2002 | Sherman et al. |
| 2003/0164386 | A1 | * | 9/2003 | Connelly et al. .............. 222/361 |

* cited by examiner

*Primary Examiner* — Lien Ngo
(74) *Attorney, Agent, or Firm* — B. Aaron Schulman, Esq.; Stites & Harbison PLLC

(57) ABSTRACT

Device for grains dosing with air sealing, comprehending a molded packaging in a way that the product within is not in direct contact with the air outside and is totally hermetical when closed, preserving its physical and chemical characteristics, therefore it is conformed basically by five pieces being one lid (1A), a container/bottle (2A), a mobile acting element (3A), a spring (4A) and a passage element (5A)1 where said lid (1A) is connected to a mobile sealing element, conformed by the container/bottle (2A), containing a fixed passage element (5A) at its top portion which may be connected to or screwed and at its bottom portion it is conformed the inlet (6A) of the dosing element; at the bottom portion of the body (1A) is provided a guide (7A) for the accommodation of the acting element (3A).

3 Claims, 9 Drawing Sheets

DEVICE FOR GRAINS DOSING WITH AIR SEALING

FIELD OF THE INVENTION

The invention herein is related to a kind of packaging conformed with resources to, during its opening, the product contained therein in not in direct contact with the air, as well as such resources are compliant to turn it hermetical when closed again, preserving the original characteristics of the content.

More particularly, the present invention refers to a grains dispenser with a compartment provided with means for sealing the air from the outside environment aiming to preserve the integrity of the product contained within, becoming ideal for the packaging of different products notably, pharmaceutical products and others which demand such care as chemicals and medical drugs.

DESCRIPTION OF THE PRIOR ART

As known by those skilled in the art of packaging medical products, nowadays there is a multiplicity of products, mainly in the medical area, whose presentation to the consumer is in solid stat, such as in the form of grains. This form of presentation is preferred when the physical chemical stability of the product demands as such.

This kind of presentation is yet more common in relation to pharmaceutical products. Most of the times, these kinds of products are stored in the inside of capsules, although, many times, depending on the quantity to be administrated they may result in an amount relatively large or too small, depending on the age of the user, what impairs the administration of the medicine in the correct dose.

Although the administration of such medicine creates a series of inconvenient issues to be performed otherwise, since the product cannot be in permanent contact with the atmospheric air, in virtue of the risks of contamination, oxidation and spoiling of the product, affects its effectiveness and reducing its life time.

Lately, this inconvenience is caused by the lack of a packaging which allows for the administration of loose grains in exact doses and that is able to preserve the utile life time (integrity) of the content after the package opening.

What is needed therefore is a packaging able to store products in grains our powder form, keeping them outside the direct contact with the atmospheric air, even during their administration.

Other object of the present application is the fact that the package is dimensioned for different doses of the product, in a way it can attend to the prescribed treatment and to the indicated use in the correct dose. A characteristic point of the present application is in the fact of granting a hermetically sealed package that can be handled without the product within being exposed to direct contact with the atmospheric air, therefore reducing the products spoiling risks.

Another characteristic point of the present application is to make easy the administration of products that, for example, in the form of capsules, would have difficult ingestion due to heir sizes, or in another example, in the cases of chemical products which demand their administration in higher doses without manual handling.

SUMMARY OF THE INVENTION

In this way, the present application shows a new disposition able to store a product in the form of grains or powder and keep them hermetically sealed when the package is closed and protected when the package is being used, as well as to dose the amount to be administered according to the prescribed treatment (or the indicated use). This way, for a better understanding of the invention above, bellow is presented a brief description of the drawings, illustrated in the accompanying drawing sheets where the FIGS. 1 to 5 show a preferred embodiment in accordance to the Brazilian priority BR C10603468-3 of Aug. 24, 2006 and the FIGS. 6 to 11 show another preferred embodiment according to the Brazilian priority BR C10603468-3 (Addition Certificate) of Jan. 12, 2007.

The present application seeks to provide a device for grains dosing with air sealing comprising: (a) a lid (1A), having an upper part having an opening and a lower part having an inlet (6A), a pre-chamber (10A) defining a predetermine dosage, an opening outlet (9A), a guide (7A) including a coupling element (8A) and encasing a spring (4A), and a mobile acting element (3A); the opening outlet (9A) misaligned with inlet (6A) when the spring is in the a rest position, (b) a passage element (5A) having a locking fixture (11A), the passage element (5A) connected to the upper part of the lid (1A), and (c) a bottle (2A), having an upper part and a lower part, the lower part of the bottle (2A) connected to the passage element (5A) and the bottle containing grains (G). When bottle (2A) and the passage element (5A) with the locking fixture (11A) are displaced upwards, the locking fixture (11A) unlocks the acting element (3A), and the predetermined dosage of the grains is transferred due to the gravitation force from the bottle (2A) and is accommodated within the pre-chamber (10A), and when the acting element (3A) is actuated, the spring (4A) is compressed in the guide (7A) and coupled at the coupling element (8A), the opening outlet (9A) is placed in alignment with inlet (6A), releasing the predefined dosage of the grains.

The present application seeks to provide a device for grains dosing with air sealing comprising: (a0 a container (1B), having an upper part and a lower part, the container containing grains (GB); (b) a passage fixed element (2B), having an inner open part and an outer part, including a circular section with a central opening where coupling elements (6B) are provided, radially conformed in the inner open part, the inner open part attached to the lower part of the container and the outer part of the container having a protection lock (8B) having an end; (c) a mobile intern body (3B), attached to the outer part of the passage fixed element (2B), and a side opening (R) for the passage of the protection lock (8B); (d) a central protrude (7B) of an ogival-shape, vertically fixed inside the passage fixed element (2B) and the mobile intern body (3B), and having a sealing bolt (P) in a lower end, the central protrude having openings for the grains (GB) passage from the container (1B) to the mobile intern body (3B), in a parallel direction with the central protrude (7B) and the protection lock (8B); (e) a fixed overcoat (5B) having an upper part and a lower part, the upper part encasing the mobile intern body (3B) and creating a sealed environment; the lower part having a cut in curve and presenting a side opening (9B); (f) a mobile acting element (4B) tightly assembled at a bottom portion of the mobile intern body (3B) in the fixed overcoat (5B), the acting element having a circular shape button (13B), a groove (10B) encasing a driving spring (12B), an upper passage (11B) aligned with the sealing bolt (P) of the central protrude (7P) and a lower passage (11B') misaligned with the upper passage (11B)) when the spring is in the a rest position; and having an outlet (17B) aligned with the lower passage (11B'); and having a movable dosing chamber (16B) defining a predetermine dosage, placed between circular shape button (13B) and the driving spring (12B), and a second protrude (15B) located one side of the groove (10B), having a guide (14B) to guide the acting element, and (g) a movable containing sphere (19B) moving in a 45° groove (20B) between the passage fixed element (2B) and the mobile intern body (3B), preventing the end of the protection lock (8B) from entering the side opening (R), and a course guide (18B) to guide the protection lock (8B). When the container (1B), the passage fixed element (2B) and the mobile intern body (3B) are displaced upwards, the sealing bolt (P) of the protrude (7B) is displaced from the upper passage (11B) of the a mobile acting element (4B), the predetermined dosage of the grains (GB) is transferred due to the gravitation force from the container (1B) through the passage opening (11B) to accommodate inside the dosage chamber (16B); and when the mobile acting element (4B) is actuated, the spring (12B) is compressed in the groove (10B) until the dosing chamber (16B) is duly aligned with the lower passage (11B') and with outlet (17B), releasing the predetermined dosage of the grains (GB).

DETAILED DESCRIPTION OF THE INVENTION

Figure 1:
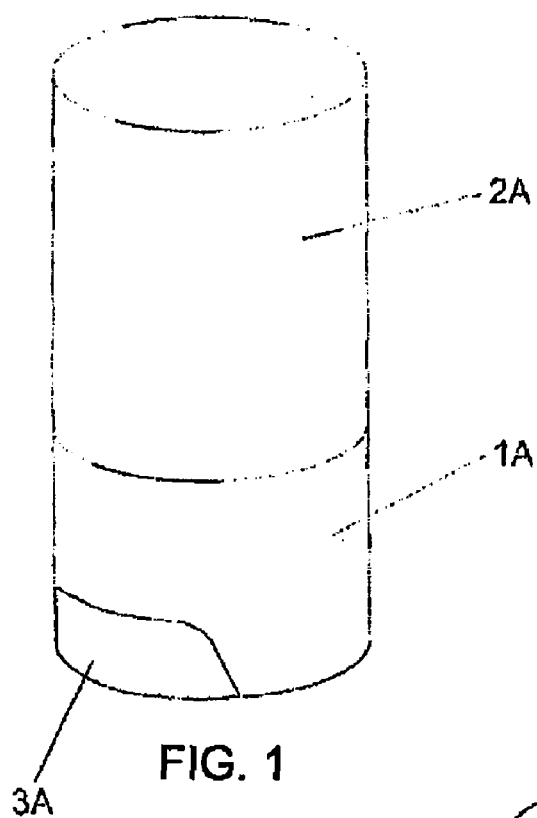
FIG. 1—Shows a perspective view of the present device duly assembled and closed.
Figure 2:
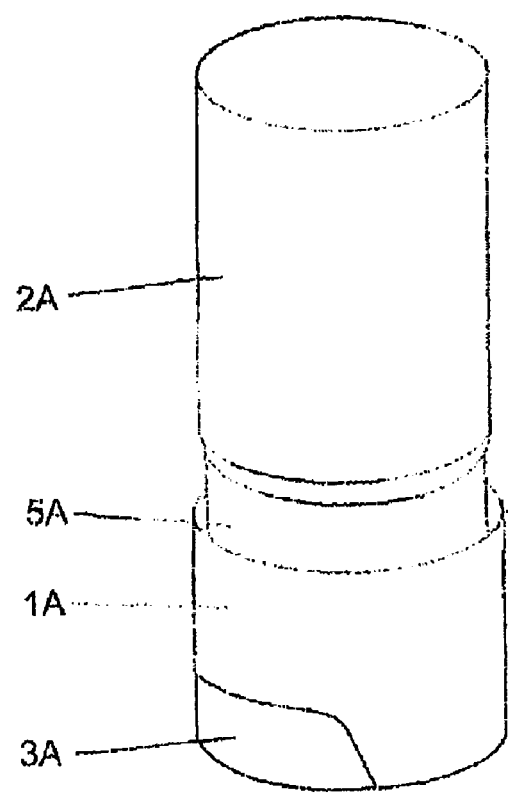
FIG. 2—Shows a view like the previous one, although depicting the present device in an opened position.
Figure 3:
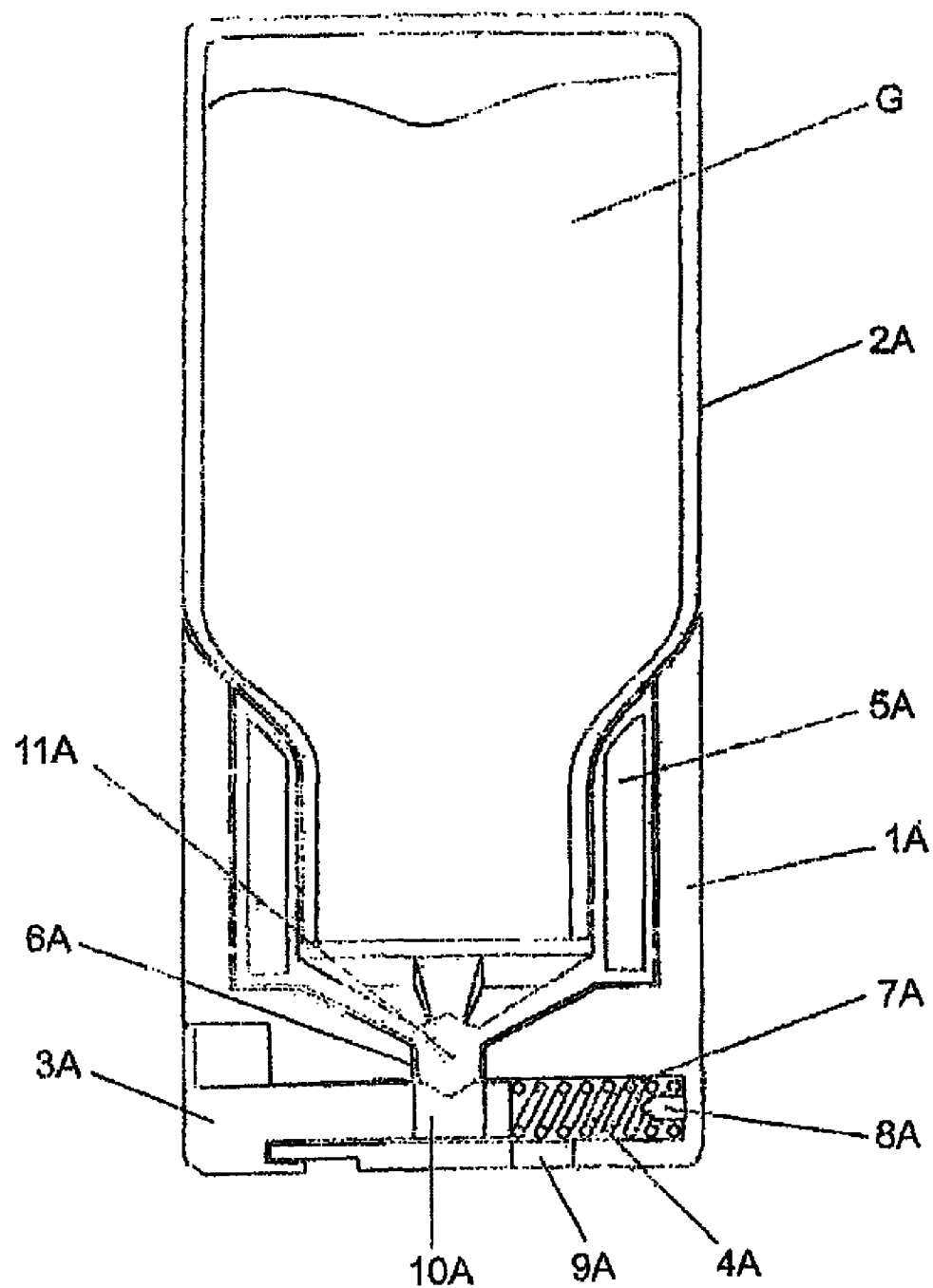
FIG. 3—Shows a sectional side view of the present device in a closed position.
Figure 4:
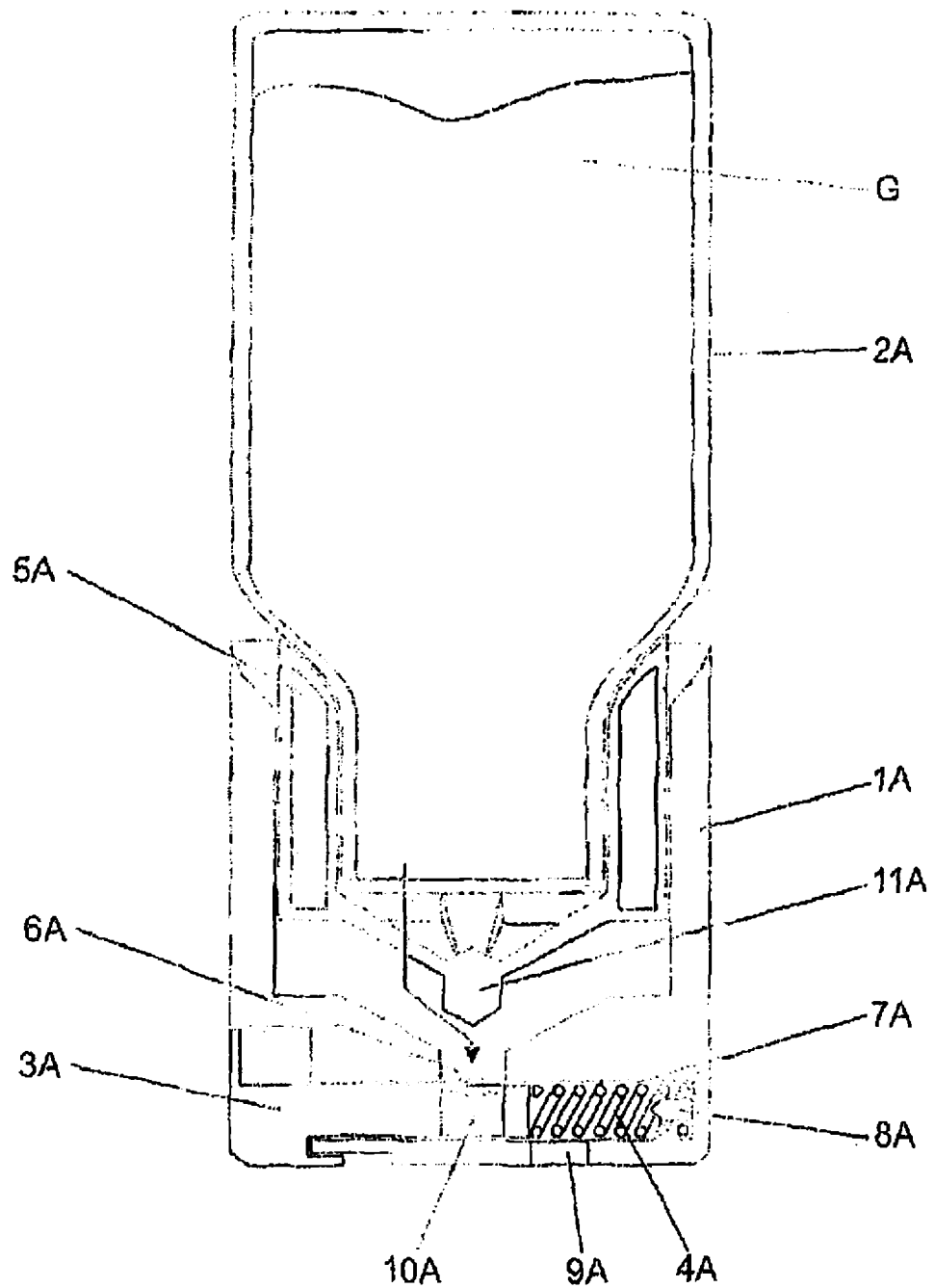
FIG. 4—Shows a view like the previous one, although depicting the present device in an opened position.
Figure 5:
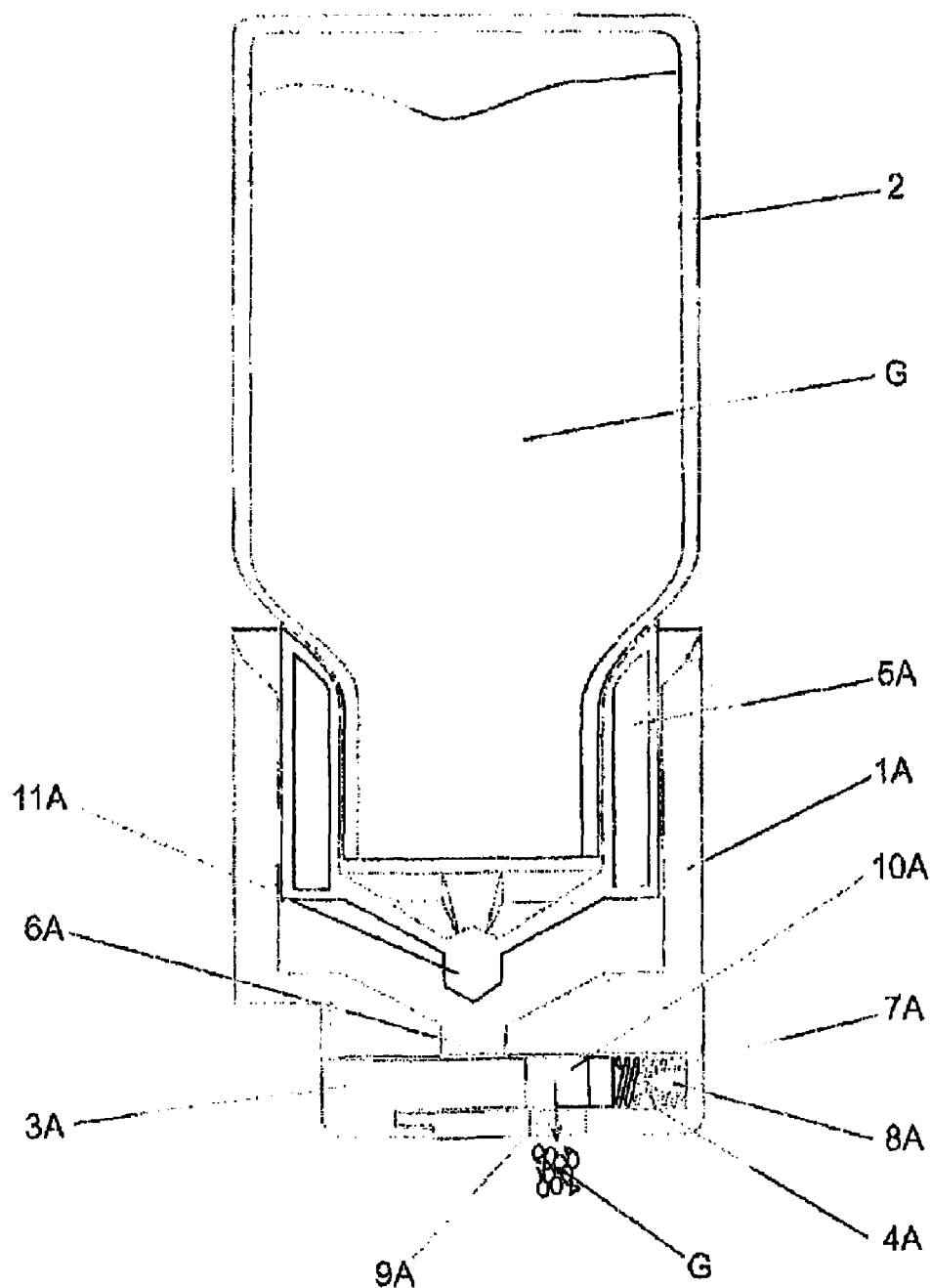
FIG. 5—Shows a view like the previous ones, although depicting the functionality of the invention.

FIGS. 1 to 5 show that the device for grains dosing with air sealing is conformed basically by five pieces being one lid (1A), a bottle (2A), a mobile acting element (3A), a spring (4A) and a passage element (5A), where all said pieces, with exception of the lid (1A) and the container/bottle (2A) are preferably produced urn plastic material suitable for the use in storing the product.

Said lid (1A) is connected to a mobile sealing element, conformed by the bottle (2A), doted with a fixed passage element (5A) at its top portion which may be connected to or screwed and at its bottom portion it is conformed the inlet (6A) of the dosing element.

At the bottom portion of the lid (1A) is provided a guide (7A) for the accommodation of the acting element (3A). At the inside portion of said guide (7A), is provided a coupling element (8A) of the spring (4A).

Yet, at the bottom portion of the lid (1A), is provided an opening outlet (9A) for the grains (G) outlet, which is conformed in a way displaced in relation to the inlet (6A) of the bottle.

The bottle (2A) presents the feature of being the grains (G) holding compartment, being displaced when in its free position, in a way to allow the predefined dosage accommodation within a pre-chamber (10A).

The acting element (3A), by its turn, is accommodated along with said guide (7A), having a pre-chamber (10A), whose capacity is exactly the predefined dose.

According to such constructive characteristics, said parts are assembled to form the device itself. The functioning is achieved in a way that when a given necessity of grains (G) administration is required, the bottle (2A) and the lid (1A) are placed apart, it means, the bottle (2A) is displaced upwards in relation to the lid (1A), allowing the grains (G), due to the gravitation force, to run to the inside portion of the pre-chamber (10A) present at the acting element (3A).

Before the bottle (2A) is displaced, the acting element (3A) has its movement blocked by a locking fixture (11A), formed at the bottom portion of said passage element (5A) helping the perfect air sealing.

Since the passage compartment (10A) has a predefined size, the supported quantity per utilization is always the same. After the grains (G) or powder are positioned, the acting element (3A) is pressed and the spring (4A) is pressed and allows the pre-chamber (10A) to align with the opening outlet (9A) enabling the grains (G) or powder exit.

The pre-chamber (10A) is formed on the acting element (3A) and the inlet (6A) of the dosing element and the opening outlet (9A) are formed in a not aligned way, limiting the direct contact with the air and avoiding the air to enter in the storing container/bottle (2A).

After the grains (G) release, de acting element (3A) receives the spring (4A) pressure, allowing it to return to its normal position and enabling the lid (1A) to be closed, what locks again the whole set and seals the inlet (6A) of the dosing element.

This way, the grains (G) or powder remain without contact with the air, ensuring the absence of contamination or material spoiling, as well as facilitating the administration of the product doses without the need of capsules, or dosing cups.

Figure 6:
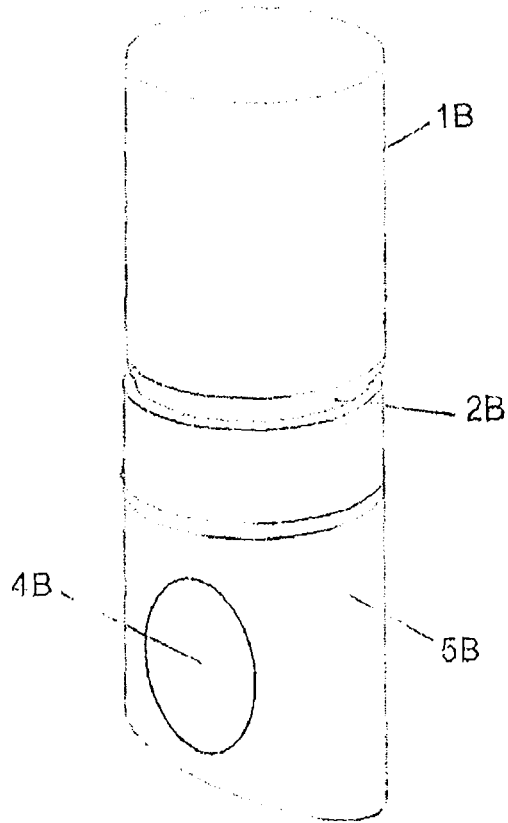
FIG. 6—Shows a perspective view of the present device duly assembled and closed.
Figure 7:
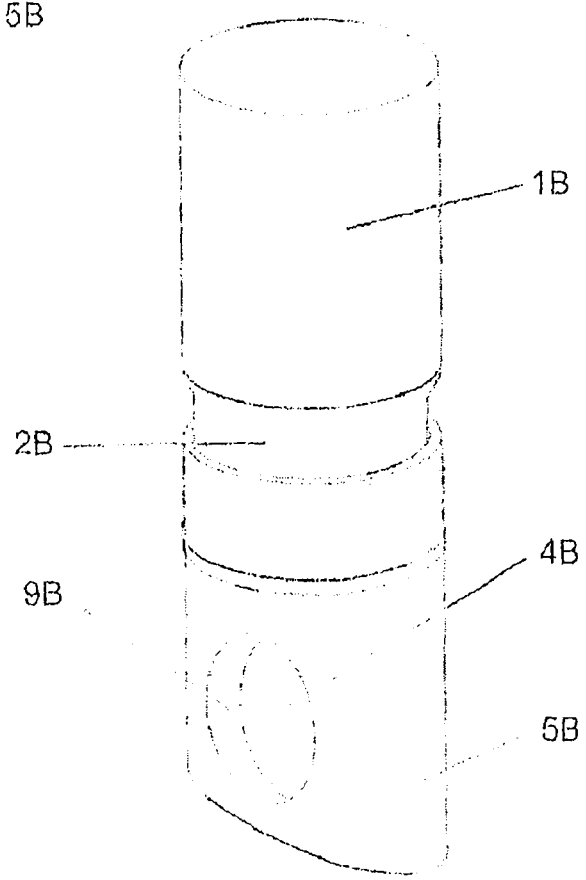
FIG. 7—Shows a view like the previous one, although depicting the present device in an opened position and with the opening in action.
Figure 8:
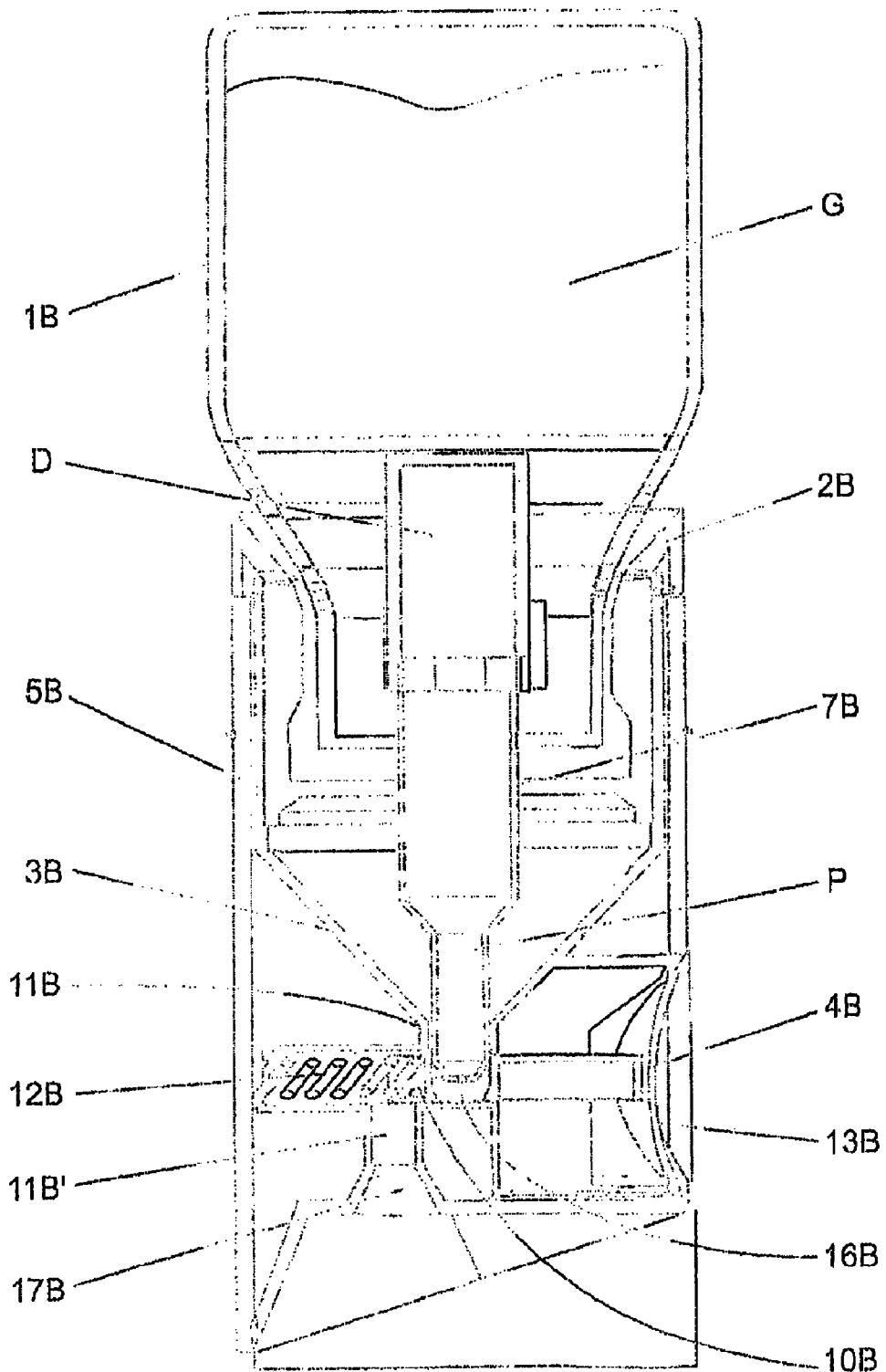
FIG. 8—Shows a sectional side view of the present device in a closed position.
Figure 9:
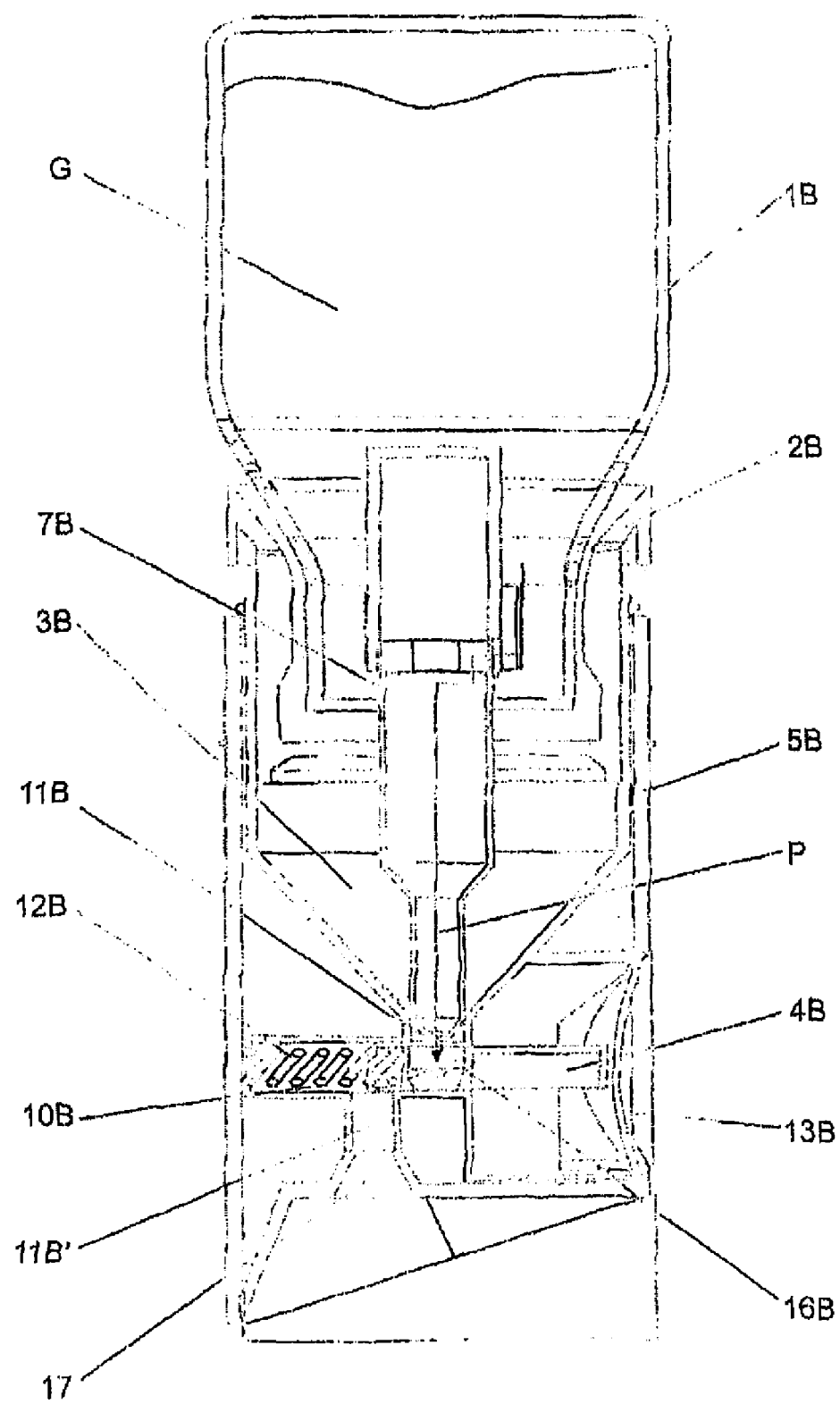
FIG. 9—Shows a view like the previous one, although depicting the present device in an opened position.
Figure 10:
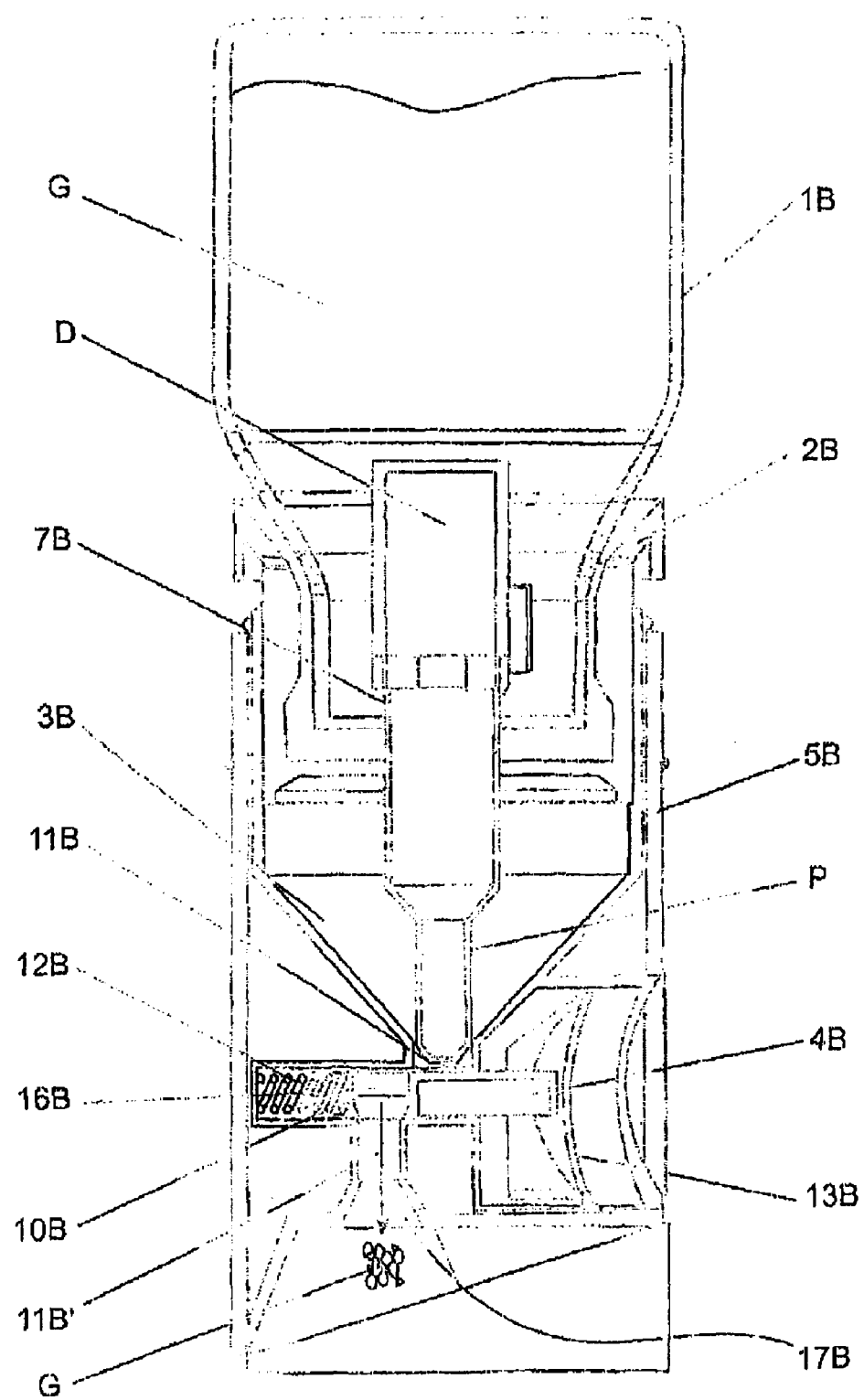
FIG. 10—Shows a view like the previous ones, although depicting the functionality of the invention.
Figure 11:
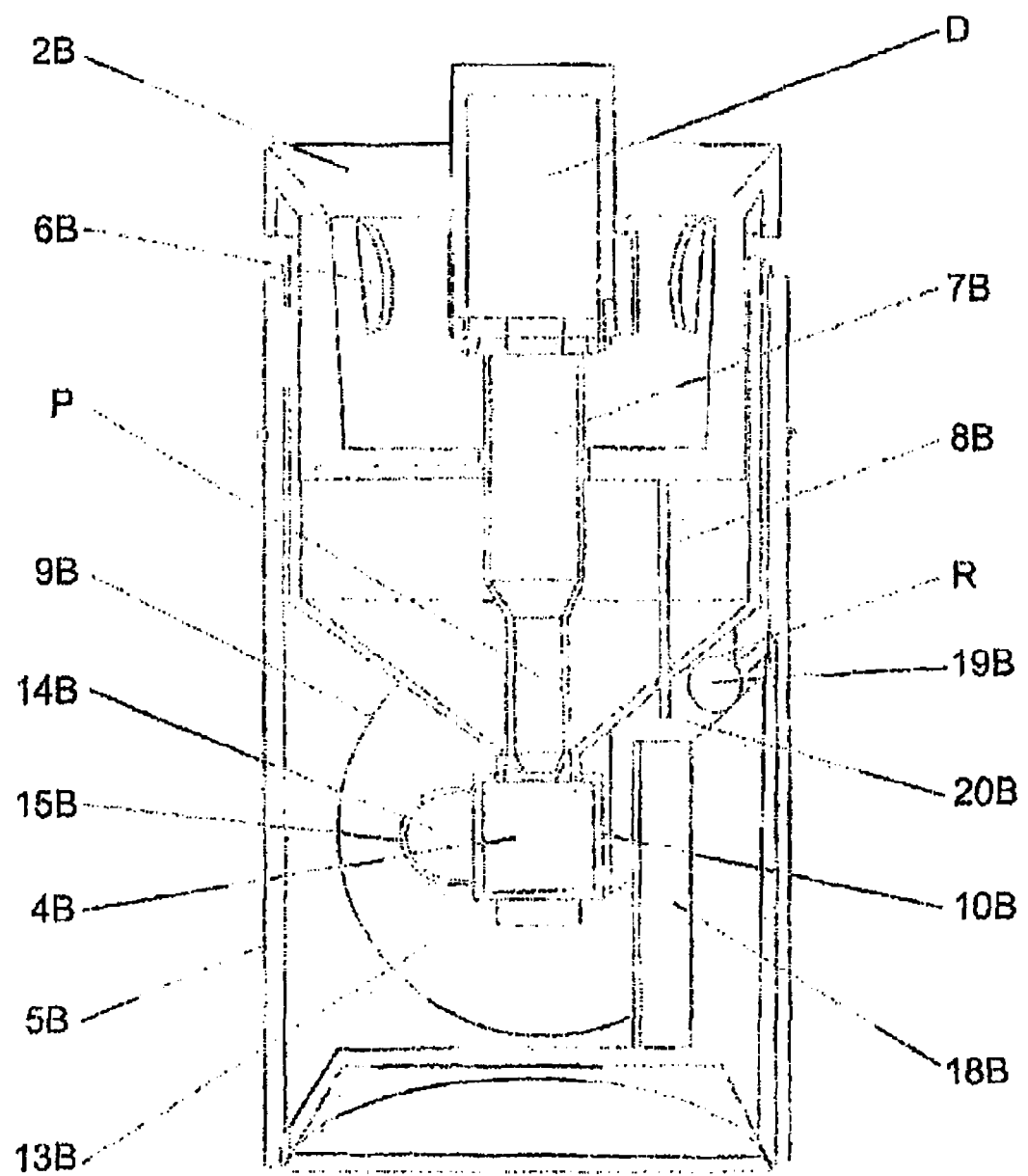
FIG. 11—Shows another sectional side view of the present device, although in a cross section depicting only the bottom part of the present device.

In another preferred embodiment of the invention, FIGS. 6 to 11 show that the device for grains dosing with air sealing is conformed by eight pieces being one a container (1B), a passage fixed element (2B), a mobile intern body (3B), an mobile acting element (4B), a fixed overcoat (5B), a driving spring (12B) and a containing sphere (19B). Except for the container (1B), the driving spring (12B) and the containing sphere (19B), all the other parts are preferably produced in plastic suitable for the use with the product to be stored.

Container (1B) presents itself as a reservoir for storing the grains (G) configuring the top portion of the package.

Container (1B) is duly fixed along with the referred passage fixed element (2B), which presents a circular section with a central opening where coupling, fixation or screwing elements (6B) are provided, radially conformed in the inside portion of said opening.

Said passage fixed element (2B) further has a central protrude (7B) which configures in one of its ends a sealing bolt (P) in an ogival shape and at the other end an optional container which allows the inclusion of an adhering material (D) for moisture absorption and around its axe, openings for the grains (G) passage from the container to the mobile intern body (3B). Parallel to such protrude (7B) is provided a protection lock (8B), necessary to prevent the device to be closed in the wrong position.

Said passage fixed element (2B) along with the container (1 B) form the top portion of the package that, by its time, constitutes a fixed part totally sealed.

The bottom portion is composed by the fixed overcoat (5B) which has a circular perimeter, being opened in its top portion and presenting a cut in curve in its bottom part, aiming to avoid the storage facing down.

Said fixed overcoat (5B) further presents a side opening (9B), which is suitable for the assembling of the mobile acting element (4B). Internally, said fixed overcoat (5B) is assembled at the mobile intern body (3B) which has a groove (10B) for the assembling of the acting element, as well as is doted with passages (11 B) and 11 B') which are duly displaced among themselves.

The top portion of the said mobile intern body (3B) is suitable for coupling to the passage element and further allow displace therein (2B), so that the passage opening (11B) is duly aligned with the sealing bolt (P) of protrude (7B), as well it is provided a side opening (R), for the passage of the protection lock (8B).

The fixed overcoat (5B) is fixed in the mobile intern body (3B) forming the bottom part of said device that alongside displace themselves over the container (1 B) passage fixed element (2B), (top part), allowing this way, the opening and the closure of the system. Between the fixed overcoat (5B) and the mobile intern body (3B) it is incorporated a containing sphere (19B) that displaces in a groove (20b) formed by the union of the both parts at the position of 45°. Said containing sphere (19B) avoids that the end of the protection lock (8B) of the passage fixed element (2B) gets into the side opening (R) of the mobile intern body (3B), making the user to position the device always in the correct position to close it, it means, with the top part of the device facing downwards and consequently with the grains (G) perfectly positioned out of the passage opening (11 B) and the movable dosing chamber (16B).

The mobile acting element (4B) is tightly assembled at the bottom portion of the mobile intern body (3B), more precisely at the groove (10B).

Said mobile acting element (4B) has a side protrude which accommodates a spring (12B) which, by its turn, couples to a second protrude (15B) located at the side to the groove of the mobile intern body (3B), ensuring the acting element return after being used. At one end, it presents a circular shape (13B) like a button, being aligned and positioned along with the side opening (9B).

The mobile acting element (4B) further has at its groove (10B) displacement end, a movable dosing chamber (or recipient) slightly concave (16B) opened at its top and bottom ends.

Having at sight such constructive features, the functioning of the present device is given such that when with all the parts assembled the reservoir (1B) gets full with a predetermined amount of grains (G). The device is stored with the reservoir (1B) turned downwards.

When not being used, it is not possible to start the mobile acting element (4B), because the sealing bolt (P) of the passing element stays positioned hermetically sealing the passage opening (11 B) inside the movable dosing chamber (16B) of the mobile acting element (4B), avoiding its start and avoiding the air entrance.

When its use is required, the device is placed in the use position (with the reservoir upwards) and the container/reservoir (1 B) along with the passage fixed element (2B) are displaced upwards. With such displacement the sealing bolt (P) of the protrude (7B) recedes from the passage opening (11 B) of the mobile intern body (3B), automatically opening the device and allowing the grains (G) to displace downwards by gravidity force, passing through the passage opening (11 B) to accommodate inside the movable dosing chamber (16B). This movable dosing chamber (16B), by its turn, has volume ($mm^3$) equivalent to a dose (grams) desired of the product to be administered avoiding mistakes in the dose administration and spoiling in the use.

With the grains (G) positioned in the movable dosing chamber (16B), the mobile acting element (4B) is started, pushing against the driving spring (12B) until the movable dosing chamber (16B) is aligned with the passage opening (11B') of the mobile intern body (3B), that, by its turn, is duly aligned with the outlet (17B) provided at the bottom face of the fixed overcoat (5B), releasing the dose.

After the grains (G) exit and the dose releasing, the mobile acting element (4B) returns to its initial position through the action of the driving spring (12B) and a new dose, migrates (flow) to the inside portion of the movable dosing chamber (16B) for the next application. After the use, the package (device) may be closed (o), turning the container (1B) downwards pressing the bottom portion over the top portion, what consequently displaces the sealing bolt (P) at the protrude (7B), under pressure, to the inside portion of the passage opening (11B) hermitically sealing the package (device).

At this position, the containing sphere (19B) position allows that the side opening (R) of the mobile intern body (3B) is free for the passage (penetration) of the protection lock (8B) of the fixed element (2B) allowing the system sealing (P in 11B) without the interference of the grains (G) at that point.

This way, the grains (G) remain without the contact with the atmospheric air, avoiding contamination and oxidation of the product inside the container/reservoir (1 B), as well as facilitating the administration of doses without the need of using capsules or handling the product.

The invention claimed is:

1. A device for grains dosing with air sealing comprising:
(a) a lid (1A), having an upper part having an opening and a lower part having an inlet (6A), a pre-chamber (10A) defining a predetermine dosage, an opening outlet (9A), a guide (7A) including a coupling element (8A) and encasing a spring (4A), and a mobile acting element (3A); the opening outlet (9A) misaligned with inlet (6A) when the spring is in the a rest position,
(b) a passage element (5A) having a locking fixture (11A), the passage element (5A) connected to the upper part of the lid (1A), and
(c) a bottle (2A), having an upper part and a lower part, the lower part of the bottle (2A) connected to the passage element (5A) and the bottle containing grains (G),
wherein, when bottle (2A) and the passage element (5A) with the locking fixture (11A) are displaced upwards, the locking fixture (11A) unlocks the acting element (3A), and the predetermined dosage of the grains is transferred due to the gravitation force from the bottle (2A) and is accommodated within the pre-chamber (10A), and when the acting element (3A) is actuated, the spring (4A) is compressed in the guide (7A) and coupled at the coupling element (8A), the opening outlet (9A) is placed in alignment with inlet (6A), releasing the pre-defined dosage of the grains.

2. A device for grains dosing with air sealing comprising:
(a) a container (1B), having an upper part and a lower part, the container containing grains (GB);
(b) a passage fixed element (2B), having an inner open part and an outer part, including a circular section with a central opening where coupling elements (6B) are provided, radially conformed in the inner open part, the inner open part attached to the lower part of the container and the outer part of the container having a protection lock (8B) having an end;
(c) a mobile intern body (3B), attached to the outer part of the passage fixed element (2B), and a side opening (R) for the passage of the protection lock (8B);
(d) a central protrude (7B) of an ogival-shape, vertically fixed inside the passage fixed element (2B) and the mobile intern body (3B), and having a sealing bolt (P) in a lower end, the central protrude having openings for the grains (GB) passage from the container (1B) to the mobile intern body (3B), in a parallel direction with the central protrude (7B) and the protection lock (8B);
(e) a fixed overcoat (5B) having an upper part and a lower part, the upper part encasing the mobile intern body (3B) and creating a sealed environment; the lower part having a cut in curve and presenting a side opening (9B)
(f) a mobile acting element (4B) tightly assembled at a bottom portion of the mobile intern body (3B) in the fixed overcoat (5B), the acting element having a circular shape button (13B), a groove (10B) encasing a driving spring (12B), an upper passage (11B) aligned with the sealing bolt (P) of the central protrude (7P) and a lower passage (11B') misaligned with the upper passage (11B)) when the spring is in the a rest position; and having an outlet (17B) aligned with the lower passage (11B'); and having a movable dosing chamber (16B) defining a predetermine dosage, placed between circular shape button (13B) and the driving spring (12B), and a second protrude (15B) located one side of the groove (10B), having a guide (14B) to guide the acting element;
(g) a movable containing sphere (19B) moving in a 45° groove (20B) between the passage fixed element (2B) and the mobile intern body (3B), preventing the end of the protection lock (8B) from entering the side opening (R), and a course guide (18B) to guide the protection lock (8B);
wherein, when the container (1B), the passage fixed element (2B) and the mobile intern body (3B) are displaced upwards, the sealing bolt (P) of the protrude (7B) is displaced from the upper passage (11B) of the a mobile acting element (4B), the predetermined dosage of the grains (GB) is transferred due to the gravitation force from the container (1B) through the passage opening (11B) to accommodate inside the dosage chamber (16B); and when the mobile acting element (4B) is actuated, the spring (12B) is compressed in the groove (10B) until the dosing chamber (16B) is duly aligned with the lower passage (11B') and with outlet (17B), releasing the predetermined dosage of the grains (GB).

3. The device for grains dosing with air sealing according to claim 2, further including an adhering material (D) for moisture absorption, adjacent to an upper part of the protrude (7B).

* * * * *